UNITED STATES PATENT OFFICE.

JOSEPH H. POTTS, OF PHILADELPHIA, PENNSYLVANIA.

ELECTRO-DEPOSITION OF NICKEL.

SPECIFICATION forming part of Letters Patent No. 223,860, dated January 27, 1880.

Application filed October 18, 1879.

To all whom it may concern:

Be it known that I, JOSEPH HUNT POTTS, of the city and county of Philadelphia, State of Pennsylvania, have invented a new and useful Improvement in the Electro-Deposition of Nickel, which process is fully set forth in the following specification.

This improvement consists in the use of a new solution from which to deposit nickel by the electric current; and its novelty is in being formed by and from ingredients heretofore held to be insoluble and detrimental to a depositing-bath.

The said solution can be formed by the addition to an acid aqueous solution of the sulphate of nickel of 1.431 specific gravity, 3.75 to 7.5 parts of hydrate of lime to one hundred parts of the solution of nickel sulphate, the exact proportion dependent upon the acidity of the nickel-sulphate solution; but as great care must be used that the hydrate of lime is not added in excess of the acid present, I use the carbonate of lime in place of the hydrate. The said carbonate is added to the acid solution of the nickel sulphate until the acid reaction ceases.

The excess of sulphate of lime formed and not dissolved and combined with the nickel sulphate is not detrimental in the bath, and the excess of carbonate of lime remaining in the solution will neutralize any excess of acid in the solution that would prove detrimental and corrode the cathode.

This solution produces a brighter metallic deposit than the solution in general use, and without the addition of ammonia in any form.

I therefore claim—

In the process of nickel-plating, a solution composed of acid solution of nickel sulphate to which carbonate of lime has been added, substantially as described.

JOSEPH HUNT POTTS.

Witnesses:
HARRISON DUFFIELD, M. D.,
JOHN B. REYNOLDS.